United States Patent
Strader et al.

(10) Patent No.: US 12,205,372 B2
(45) Date of Patent: Jan. 21, 2025

(54) DOCUMENT PORTION IDENTIFICATION IN A RECORDED VIDEO

(71) Applicant: Seismic Software, Inc., San Diego, CA (US)

(72) Inventors: Thomas H. Strader, Fort Worth, TX (US); Christopher Buchholz, Norwalk, CT (US)

(73) Assignee: Seismic Software, Inc., San Diego, CA (US)

( * ) Notice: Subject to any disclaimer, the term of this patent is extended or adjusted under 35 U.S.C. 154(b) by 0 days.

(21) Appl. No.: 18/295,733

(22) Filed: Apr. 4, 2023

(65) Prior Publication Data

US 2024/0037942 A1     Feb. 1, 2024

Related U.S. Application Data

(63) Continuation of application No. 17/873,839, filed on Jul. 26, 2022, now Pat. No. 11,663,824.

(51) Int. Cl.
G06V 20/40     (2022.01)
G06V 20/60     (2022.01)

(52) U.S. Cl.
CPC .............. *G06V 20/41* (2022.01); *G06V 20/49* (2022.01); *G06V 20/60* (2022.01)

(58) Field of Classification Search
CPC ........ G06V 20/41; G06V 20/49; G06V 20/60; G06V 20/40; G06V 30/40
See application file for complete search history.

(56) References Cited

U.S. PATENT DOCUMENTS

| | | |
|---|---|---|
| 6,968,506 B2 | 11/2005 | Yacovone |
| 8,892,989 B1 | 11/2014 | Lieb |
| 9,032,391 B2 | 5/2015 | Lieb |
| 9,294,547 B2 | 3/2016 | Lieb |
| 9,311,618 B2 | 4/2016 | Lieb |
| 9,342,814 B2 | 5/2016 | Lieb |
| 9,471,694 B2 | 10/2016 | Lieb |
| 9,609,323 B2 | 3/2017 | Lee |
| 9,900,436 B2 | 2/2018 | Raanani |
| 10,051,122 B2 | 8/2018 | Raanani |
| 10,133,999 B2 | 11/2018 | Raanani |
| 10,181,326 B2 | 1/2019 | Raanani |
| 10,324,979 B2 | 6/2019 | Raanani |
| 10,360,911 B2 | 7/2019 | Raanani |

(Continued)

FOREIGN PATENT DOCUMENTS

AU     2021200811     2/2022

OTHER PUBLICATIONS

Chorus by zoominfo. Capture & Analyze Ever Interaction Drive change and revenue impact across your organization. Call Recording | Chorus.ai. https://www.chorus.ai/product/call-recording. May 25, 2022.

(Continued)

*Primary Examiner* — Santiago Garcia
(74) *Attorney, Agent, or Firm* — Van Pelt, Yi & James LLP

(57) ABSTRACT

Document portion identification in a recorded video is disclosed, including: obtaining a recorded video; identifying a document portion that appears during the recorded video, wherein the document portion belongs to a document; and determining a video segment during which the document portion appears in the recorded video.

20 Claims, 11 Drawing Sheets

(56) References Cited

U.S. PATENT DOCUMENTS

| | | |
|---|---|---|
| 10,367,940 B2 | 7/2019 | Raanani |
| 10,387,573 B2 | 8/2019 | Raanani |
| 10,521,443 B2 | 12/2019 | Brunets |
| 10,552,932 B2 | 2/2020 | Brunets |
| 10,642,889 B2 | 5/2020 | Reshef |
| 10,726,297 B2 | 7/2020 | Hoffman |
| 10,742,695 B1 | 8/2020 | Brown |
| 10,970,492 B2 | 4/2021 | Raanani |
| 11,062,156 B1 | 7/2021 | Vallance |
| 11,087,019 B2 | 8/2021 | Levy |
| 11,108,989 B2 | 8/2021 | Lee |
| 11,115,624 B1 | 9/2021 | Brown |
| 11,232,111 B2 | 1/2022 | Gao |
| 11,392,964 B2 | 7/2022 | Gao |
| 11,417,343 B2 | 8/2022 | Cohen |
| 11,470,171 B2 | 10/2022 | Rogynskyy |
| 2013/0226979 A1 | 8/2013 | Caruso |
| 2014/0164930 A1 | 6/2014 | Lieb |
| 2014/0181204 A1 | 6/2014 | Sharp |
| 2014/0278816 A1 | 9/2014 | Sharp |
| 2014/0280120 A1 | 9/2014 | Sharp |
| 2014/0280121 A1 | 9/2014 | Sharp |
| 2015/0039998 A1 | 2/2015 | Lieb |
| 2015/0161080 A1 | 6/2015 | Sharp |
| 2015/0261758 A1 | 9/2015 | Sharp |
| 2015/0326538 A1 | 11/2015 | Keane |
| 2016/0048764 A1 | 2/2016 | Paul |
| 2016/0147396 A1 | 5/2016 | Keane |
| 2016/0217343 A1 | 7/2016 | Hoffman |
| 2016/0226811 A1 | 8/2016 | Kerschhofer |
| 2016/0227109 A1* | 8/2016 | Mattes ............... G06V 20/40 |
| 2017/0076321 A1 | 3/2017 | Reznek |
| 2017/0116342 A1 | 4/2017 | Keane |
| 2017/0315231 A1 | 11/2017 | Wodrich |
| 2018/0065623 A1 | 3/2018 | Wodrich |
| 2018/0077286 A1 | 3/2018 | Raanani |
| 2018/0146016 A1 | 5/2018 | Lieb |
| 2018/0249122 A1 | 8/2018 | Reshef |
| 2019/0057698 A1 | 2/2019 | Raanani |
| 2019/0289359 A1 | 9/2019 | Sekar |
| 2019/0361890 A1 | 11/2019 | Rogynskyy |
| 2019/0362284 A1 | 11/2019 | Wulf |
| 2019/0364131 A1 | 11/2019 | Rogynskyy |
| 2019/0370988 A1* | 12/2019 | Anderson ............ G06V 20/62 |
| 2019/0394350 A1* | 12/2019 | Pangasa ............... G06T 7/246 |
| 2020/0302491 A1* | 9/2020 | Bayer ............... H04N 21/2665 |
| 2021/0027772 A1 | 1/2021 | Horev |
| 2021/0067626 A1 | 3/2021 | Bussey |
| 2021/0089256 A1 | 3/2021 | Lieb |
| 2021/0209624 A1 | 7/2021 | Maugans, III |
| 2021/0281742 A1* | 9/2021 | Piccoli ............... G06V 10/243 |
| 2021/0287683 A1 | 9/2021 | Nareddy |
| 2021/0343282 A1 | 11/2021 | Mane |
| 2021/0383259 A1 | 12/2021 | Dmitriev |
| 2022/0004754 A1* | 1/2022 | Huang ................... G06N 3/08 |
| 2022/0078150 A1 | 3/2022 | Hempton |
| 2022/0138775 A1 | 5/2022 | Mamdur |
| 2022/0147526 A1 | 5/2022 | Gao |
| 2022/0157322 A1 | 5/2022 | Reshef |
| 2022/0222030 A1 | 7/2022 | Lawrence |
| 2022/0230116 A1 | 7/2022 | Dubey |
| 2022/0321619 A1 | 10/2022 | Brown |
| 2023/0030792 A1* | 2/2023 | Zheng ............... G06V 10/7715 |
| 2023/0116547 A1* | 4/2023 | Osborne ............ G06V 20/62 382/118 |

OTHER PUBLICATIONS

Gong for Coaching—Coach Reps Into Sales Superstars. https://www.gong.io/sales-training/. May 3, 2022.

Highspot. Highspot Announces Content Genomics. https://www.highspot.com/blog/highspot-announces-content-genomics/. May 3, 2022.

* cited by examiner

DOCUMENT PORTION IDENTIFICATION IN A RECORDED VIDEO

CROSS REFERENCE TO OTHER APPLICATIONS

This application is a continuation of U.S. patent application Ser. No. 17/873,839, entitled DOCUMENT PORTION IDENTIFICATION IN A RECORDED VIDEO filed Jul. 26, 2022 which is incorporated herein by reference for all purposes.

BACKGROUND OF THE INVENTION

In reviewing the recording of a web-based meeting, it is challenging to determine whether a document was presented or shared during the meeting and if so, which time frames of the meeting in which the document or portions of the document were shown. Also, sometimes, the same document can be lightly edited (e.g., a portion of the text customized for a particular audience) and shared during different meetings, which further complicates the attribution of which documents were shared during which meetings. It would be desirable to accurately identify which content is presented during recorded videos.

BRIEF DESCRIPTION OF THE DRAWINGS

Various embodiments of the invention are disclosed in the following detailed description and the accompanying drawings.

DETAILED DESCRIPTION

Figure 1:
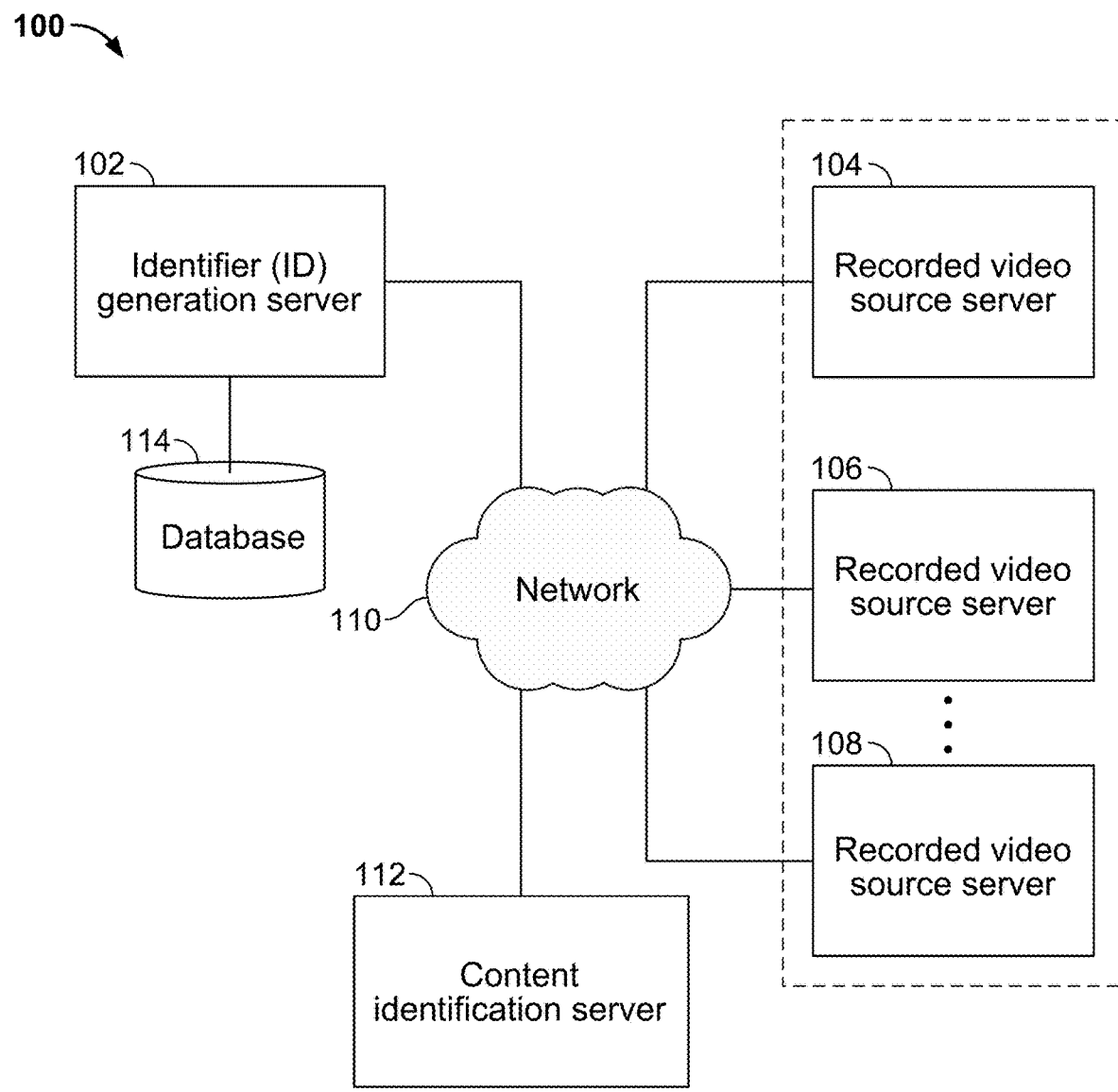
FIG. 1 is a diagram showing an embodiment of a system for identifying document portions in a recorded video.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of document portion identification in a recorded video are described herein. A recorded video is obtained. In various embodiments, the recorded video comprises a recorded online, video-based meeting/conference. For example, the meeting includes one or more individuals speaking over video and/or sharing documents from their respective computing devices (e.g., laptop computer, tablet device, or desktop computer). A document portion that appears during the recorded video is identified. The document portion belongs to a document comprising a plurality of document portions. In various embodiments, a "document" comprises a file that includes more than one document portion. A first example of a document is a slideshow (or is sometimes referred to as a "slide deck") and an example of its document portion is a single slide. A second example of a document is a word processing file and an example of its document portion is a single page. A third example of a document is a video and an example of its document portion is a set of one or more adjacent video frames. In some embodiments, prior to being presented in the video (e.g., web-based meeting), each document portion of the document has been modified to include a unique identifier (ID) that corresponds to that particular document portion. As will be described in further detail below, each document portion ID is discreet in appearance but can be accurately recognized by image processing a video frame that shows the document portion to which it has been added. A video segment (e.g., which includes a start timestamp and an end timestamp within the length of the recorded video) during which the document portion appears is determined. In various embodiments, the video frames of the recorded video are scanned for the presence of document portion IDs and the start and end timestamp associated with the appearance of a document portion ID are determined. In various embodiments, a "video segment" during which a document portion ID appears within a video can be defined by a start timestamp and an end timestamp within the video recording. As will be described below, by identifying video segments of a recorded video during which specific document portions of a document appear, meeting attributes can be aggregated at the document portion-level to provide in-depth analytics on content usage and distribution across recorded videos.

FIG. 1 is a diagram showing an embodiment of a system for identifying document portions in a recorded video. As shown in FIG. 1, system 100 includes identifier generation server 102, recorded video source server 104, recorded video source server 106, recorded video source server 108, network 110, and content identification server 112. In some embodiments, network 110 comprises data and/or telecommunications networks. Each of identifier generation server 102, recorded video source server 104, recorded video source server 106, recorded video source server 108, and content identification server 112 is configured to communicate with one another over network 110.

Identifier (ID) generation server 102 is configured to obtain documents (e.g., over network 110) and then add unique document portion-specific IDs corresponding to the document portion(s) of each document. In various embodiments, a "document portion ID" comprises a unique ID that is specific to a particular document portion of a document. In various embodiments, a document comprises one or more document portions and is therefore associated with as many document portion ID(s). In some embodiments, a document comprises at least two document portions and is therefore associated with as many document portion IDs. A "document portion" can be defined differently for each document type. A first example document type is a word processing document (e.g., a Word document, a Google Doc) or a Portable Document Format (PDF), and an example of its document portion is a page. A second example document type is a slideshow (e.g., a PowerPoint, a Google Slide, a Keynote), and an example of its document portion is a slide. A third example document type is a video, and an example of its document portion is a subset of video frames. Where the document type is a video, a document portion ID can be placed on every video frame, but often this level of detail is not needed and the video can be subdivided into sections of fixed duration such as 1, 5, 10, or 15 seconds and unique document portion IDs attributed to each of those durations, rotating new document portion IDs for each video segment. A fourth example document type is a file comprising multiple images (e.g., a GIF), and an example of its document portion is a subset of images. In some embodiments, ID generation server 102 is configured to obtain documents via uploads from client devices (not shown). In some embodiments, ID generation server 102 is configured to obtain documents via a browser-based document creation tool that ID generation server 102 provides at an associated universal resource locator (URL). In response to the upload of a new document, ID generation server 102 is configured to generate a (or otherwise obtain an already generated) unique document portion ID corresponding to each document portion of the document and then add that document portion ID to the corresponding document portion. In various embodiments, the document portion ID comprises a discreet code (which encodes an alphanumeric value) that can be added (e.g., overlaid) on a portion of the document portion without substantially obscuring the (e.g., textual/image) content of the document portion. Furthermore, the document portion ID can also be reliably recognized despite any distortion or compression of the document portion when the document portion appears in a video/screen capture. One specific example of the document portion ID is a Code 128 compliant barcode (which comprises a horizontal series of dashes) that is appended/overlaid at the bottom of a corresponding document portion, which will be described in further detail below. After adding document portion IDs to new document portions of a newly obtained document, ID generation server 102 is configured to update database 114, which it maintains. Database 114 stores mappings between a document and the document portion IDs of its document portions. As will be described in further detail below, in some embodiments, ID generation server 102 is also configured to update its database to track relationships (which is sometimes referred to as "lineage") between different versions of a document or between different documents. After ID generation server 102 updates a newly obtained document with document portion IDs (and updates database 114), ID generation server 102 is configured to download (e.g., over network 110) the modified document with encoded document portion IDs to requesting client devices (not shown) so that the modified documents can be distributed/shared, such as during web-based video meetings.

Each of recorded video source servers 104, 106, and 108 is configured to record web-based video meetings. For example, each of recorded video source servers 104, 106, and 108 may be associated with the same or different videotelephony software services. Users of a particular videotelephony software service can host and/or participate in a video meeting during which the users can speak to each other, share video footage of themselves (as captured through their cameras), and/or present/share what is on their screens. For example, during a video meeting, a user can share (e.g., through presenting what is shown on his or her own screen) documents such as those modified (e.g., by ID generation server 102) to include document portion IDs. A videotelephony software service is configured to allow users to select to record such video meetings. A recorded meeting comprises a video that includes the audio of the meeting as well as video frames that show the shared documents, if any, and video of users, if any. In some embodiments, video meetings that are recorded by recorded video source servers 104, 106, and 108 (or any other source of recorded videos) are sent to (e.g., via polling or pushing) content identification server 112.

Content identification server 112 is configured to obtain recorded videos from video sources (e.g., such as recorded video source servers 104, 106, and 108) and then scan through the recorded videos for the presence of document portion IDs (e.g., such as those generated and added to documents by ID generation server 102). In various embodiments, content identification server 112 is configured to determine a sample of video frames from a recorded video and then analyze each such sampled video frame to determine whether the video frame contains a document portion ID. For example, a video frame in which a document portion ID appears comprises a location in the recorded video in which a meeting participant had been sharing or was otherwise presenting the document portion corresponding to the document portion ID. In a specific example, a document portion ID of a slide of a slideshow may appear within the video frames of the recorded video in which a user was presenting the content on that slide during the meeting. In some embodiments, and as will be described in further detail below, in response to determining that a video frame includes a document portion ID, content identification server 112 is configured to compare the value that is encoded by the found document portion ID against the document portion ID to document mappings that are stored in database 114 to determine whether a match is found. In the event that a match in database 114 is found, content identification server 112 is configured to construct a timeline of the locations during the length of the recorded video during which that document portion ID appears within video frames by reviewing the video frames of the recorded video. In various embodiments, a document portion ID may appear during more than one video segment (which can be defined by the segment's corresponding start timestamp and end timestamp) of the recorded video.

After content identification server 112 determines the one or more video segments of a recorded video during which each of one or more document portion IDs (e.g., that match mappings stored in database 114) appeared, content identification server 112 is configured to extract signals/metadata from each video segment during which a corresponding document portion ID appeared. In a first example, content identification server 112 is configured to extract signals from the audio portion (or the text transcription thereof) (which includes recorded speech) corresponding to a video segment during which a document portion ID appeared. In a second example, content identification server 112 is configured to compare the content in a video frame of a video segment during which a document portion ID appeared against the stored content (e.g., as stored in database 114) of the document portion associated with that document portion ID to determine whether any changes in the content can be detected (e.g., due to a user's offline modification to that document portion). For example, the text (e.g., as determined via optical character recognition (OCR)) on the document portion in the video frame in which a document portion ID was detected can be compared to the text that is included in the stored version of the document portion associated with that document portion ID to determine any differences. Content identification server 112 can aggregate extracted signals/metadata associated with the same document portion ID obtained across multiple recorded videos in which that document portion ID had appeared. In some embodiments, the aggregated document portion ID specific (and hence, corresponding document portion specific) signals/metadata (e.g., discussed topics, keywords, and/or expressed emotions/sentiment of a speaker) can be presented by content identification server 112 (or another entity) at user interfaces to provide aggregated statistics/insights on the actual distribution and/or usage of its corresponding document at the document portion granularity. In some embodiments, the aggregated document portion ID specific (and hence, corresponding document portion specific) signals/metadata can be compared by content identification server 112 (or another entity) to rules to generate recommendations (e.g., regarding the way that the document should be shared during future meetings) to be presented at a user interface.

In some embodiments, ID generation server 102 and content identification server 112 are operated by the same party. In some embodiments, ID generation server 102 and content identification server 112 comprise at least some of the same hardware (e.g., physical devices that implement the servers). In some embodiments, database 114 is not local to identifier generation server 102 and is otherwise accessible to both ID generation server 102 and content identification server 112 over network 110.

As shown by the example of system 100, various embodiments described herein enable document portions of a document to be uniquely identified by and modified to include corresponding document portion IDs. The document portion IDs are selected to be discreet, perhaps visible to the human eye, but not distracting when they are incorporated into document portions. The document portion ID of a document portion allows the presence of that document portion within a video frame of a recorded video (e.g., of a video-based meeting) to be uniquely detected, regardless of the video's origin or the platform (e.g., video meeting provider) that had recorded the recorded video. The detected locations/video segments within the recorded video during which the document portion ID appears can be analyzed to determine presentation/distribution/usage analytics with respect to not only the document to which the document portion belongs but also at the specific level of the document portion associated with that document portion ID. As such, valuable statistics and other attributes associated with the presentation/distribution/usage of documents can be obtained at the document portion-specific level. Furthermore, in addition to monitoring the use of content during recorded videos (e.g., of meetings), various embodiments described herein can also be used to identify content heritage/lineage and modification to content. As content is modified from its original form, the document portion ID can be leveraged to determine the content's original source and when combined with additional content analysis techniques can determine if and how the content was modified from a previous version.

Figure 2:
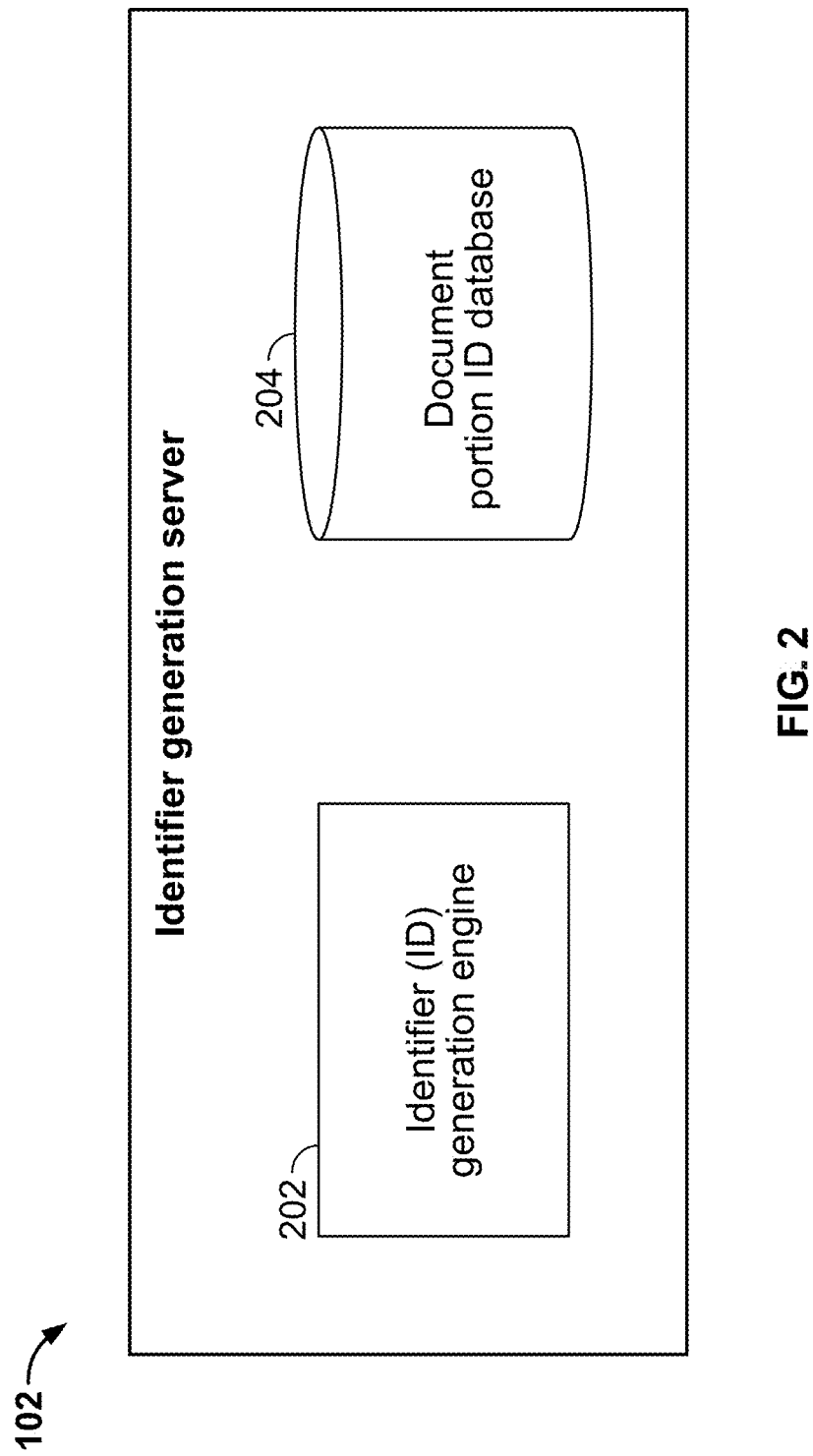
FIG. 2 is a diagram showing an example of an identifier generation server in accordance with some embodiments.

FIG. 2 is a diagram showing an example of an identifier generation server in accordance with some embodiments. In some embodiments, identifier generation server 102 of system 100 of FIG. 1 can be implemented using the example identifier generation server of FIG. 2. In the example of FIG. 2, the identifier generation server comprises identifier generation engine 202 and document portion identifier database 204. Each of identifier generation engine 202 and document portion identifier database 204 may be implemented using hardware (e.g., processor and memory) and/or software.

Identifier (ID) generation engine 202 is configured to obtain newly uploaded documents. For example, a newly uploaded document could be one to which ID generation engine 202 had not previously added document portion IDs and/or for which no corresponding entry is stored at document portion ID database 204, which will be described further below. In another example, a newly uploaded document could be one to which ID generation engine 202 had previously added document portion IDs but may include updated content on one or more document portions and/or for which a corresponding entry is stored at document portion ID database 204. In some embodiments, ID generation engine 202 is configured to determine that a newly obtained document is a document to which it had previously added at least one document portion ID by scanning the document portions to determine whether a found document portion ID, if any, matches one that is already included in entries stored in document portion ID database 204. In the event that ID generation engine 202 determines that the newly obtained document is new (e.g., includes no document portion ID, includes a document portion ID that matches one that is stored at document portion ID database 204 but includes updated content, or a document portion ID that does not match one that is stored at document portion ID database 204), ID generation engine 202 is configured to generate a respective (or otherwise obtain an already generated) unique document portion ID and append that unique document portion ID corresponding to the each document portion thereof (e.g., a new document portion is one that does not include a document portion ID that matches one that is stored at document portion ID database 204 or is one that includes a matching document portion ID but with updated content relative to the stored document portion with that document portion ID). Where a document portion of a newly obtained document includes a document portion ID that matches one stored at document portion ID database 204 but includes content on that corresponding document portion that differs (e.g., has been changed) from the content of a stored version of a document portion with that same document portion ID, then the newly obtained document may comprise a different version of a document for which information had been stored at document portion ID database 204. For example, a document portion ID comprises a barcode that features a large horizontal scaling with relatively low vertical size requirements and this document portion ID can be placed at the bottom of a corresponding document portion (e.g., page, slide, video frame, or image).

ID generation engine 202 is configured to store information associated with each new document to which it had added document portion IDs at document portion ID database 204. ID generation engine 202 is configured to update previous information associated with each updated document to which it has added new document portion IDs at document portion ID database 204. In some embodiments, document portion ID database 204 stores an entry that corresponds to each document to which ID generation engine 202 has added document portion IDs. For example, each entry stored at document portion ID database 204 includes one or more of the following: the underlying data of a document, a filename of the document, document portion IDs corresponding to the document portions of that document, a time at which the entry corresponding to the document was last updated, and, if any, associating data (e.g., references, pointers) that links the document to one or more other versions of the document for which entries are stored at document portion ID database 204. In some embodiments, associating data that links a document to one or more other versions of the document for which entries are stored at document portion ID database 204 can be used to determine lineage or other relationships among different versions of a document. For example, different versions of a document may include substantially similar content but different versions of the document may include some document portions that have been customized for different audiences. In one specific example, different versions of the same slideshow document may include different text that identifies different audiences for which they were intended.

Figure 3:
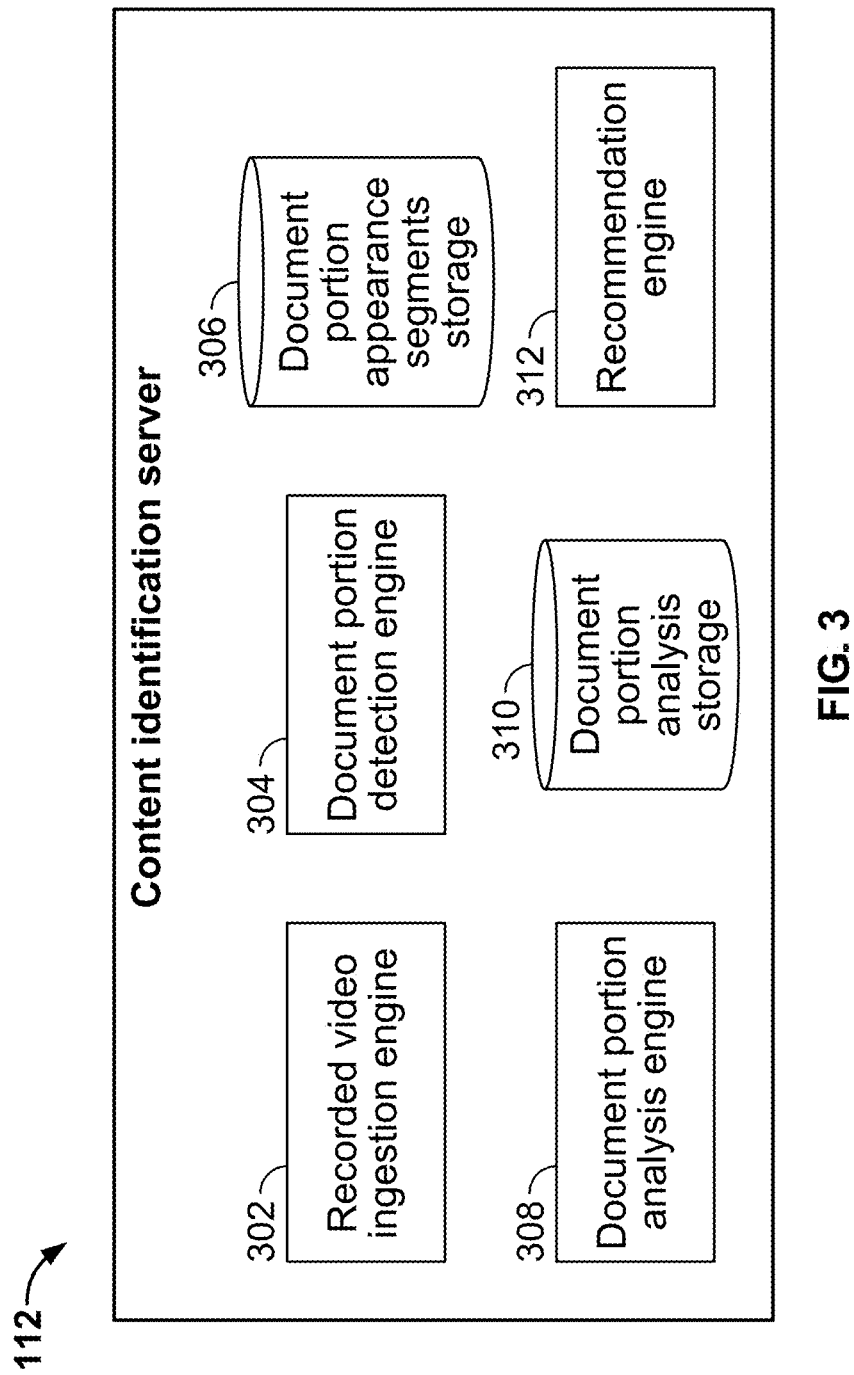
FIG. 3 is a diagram showing an example of a content identification server in accordance with some embodiments.

FIG. 3 is a diagram showing an example of a content identification server in accordance with some embodiments. In some embodiments, content identification server 112 of system 100 of FIG. 1 can be implemented using the example content identification server of FIG. 3. In the example of FIG. 3, the content identification server comprises recorded video ingestion engine 302, document portion detection engine 304, document portion appearance segments storage 306, document portion analysis engine 308, document portion analysis storage 310, and recommendation engine 312. Each of recorded video ingestion engine 302, document portion detection engine 304, document portion appearance segments storage 306, document portion analysis engine 308, document portion analysis storage 310, and recommendation engine 312 may be implemented using hardware (e.g., processor and memory) and/or software.

In some embodiments, the example content identification server of FIG. 3 may share at least some of the same physical components as the example identifier generation server of FIG. 2. In some embodiments, the example content identification server of FIG. 3 is operated by the same party as the example identifier generation server of FIG. 2.

Recorded video ingestion engine 302 is configured to obtain recorded videos from one or more recorded video source servers. For example, the recorded videos comprise video-based meetings or a video screen capture (e.g., a user that recorded himself or herself practicing a presentation). In some embodiments, recorded video ingestion engine 302 is configured to poll each of one or more recorded video source servers for recently recorded videos. In some embodiments, recorded video ingestion engine 302 is configured to receive recently recorded videos via webhooks associated with applications that provide video conferencing/meeting services. In some embodiments, recorded video ingestion engine 302 is configured to continuously receive new portions of video recordings that are still in progress until the video recording is complete. In some embodiments, recorded video ingestion engine 302 is configured to receive recorded videos that have completed recording.

After document portion detection engine 304 obtains a recorded video, document portion detection engine 304 is configured to select a sample comprising a subset of the video frames of the recorded video. For example, the sample of video frames may include video frames that are located at every predetermined interval in the video, video frames in a separate file (as provided by the video-based meeting service) that includes only video frames with screen shared content, and unique video frames (e.g., video frames that are determined to be unique relative among their temporal neighborhood of video frames) within the recorded video. In some embodiments, document portion detection engine 304 is configured to preprocess each sampled video frame to constrain the scan for a document portion (ID) identifier to less than the entire video frame. Examples of preprocessing a sampled video frame include to crop the video frame and/or filter out certain colors that are not likely to be associated with the document portion ID. Document portion detection engine 304 is configured to scan each (preprocessed) sampled video frame (in the chronological order in which they appear within the recorded video) for the presence of a document portion ID. In some embodiments, document portion detection engine 304 is configured to recognize or to call an application programming interface (API) to a computer code library that includes the functionality to recognize the type/attributes/characteristics of document portion IDs that had been generated and/or added by an ID generation server (e.g., ID generation server 102 of system 100 of FIG. 1) to documents. For example, the document portion ID comprises a Code 128 barcode. In the event that document portion detection engine 304 detects a document portion ID in the sampled video frame, then document portion detection engine 304 is configured to store a timestamp corresponding to that sampled video frame as a start timestamp associated with a current video segment within the recorded video corresponding to that particular document portion ID. Document portion detection engine 304 is configured to (e.g., preprocess and then) scan (sampled) video frames that appear subsequent to the video frame associated with the start timestamp of the video segment until document portion detection engine 304 detects a video frame with either no document portion ID or a document portion ID different from the one associated with the current video segment. In the event that document portion detection engine 304 detects a subsequent sampled video frame with no document portion ID, then document portion detection engine 304 is configured to store a stop timestamp associated with the current video segment. In the event that document portion detection engine 304 detects a subsequent sampled video frame with a different document portion ID, then document portion detection engine 304 is configured to store a stop timestamp associated with the current video segment and store a start timestamp associated with a new current video segment within the recorded video corresponding to the new/different document portion ID. Document portion detection engine 304 is configured to (optionally) preprocess and then scan sampled video frames for the presence of document portion IDs in a similar manner as described above until the last sampled video frame is scanned. After processing a recorded video, document portion detection engine 304 is configured to determine for each detected document portion ID, a timeline of the locations in the recorded video in which the document portion ID was seen/detected. Put another way, a timeline corresponding to a document portion ID in a recorded video comprises one or more video segments (e.g., each defined by a respective start timestamp and end timestamp) of the video in which the document portion ID appears. Document portion detection engine 304 is configured to store video segments (e.g., including the start and end timestamps) and their corresponding document portion IDs that were detected in the recorded video at document portion appearance segments storage 306. In one recorded video, document portion IDs associated with one or more different documents may appear (e.g., because more than one document can be shared/presented within a recorded video-based meeting).

Document portion analysis engine 308 is configured to analyze the video segments (e.g., for which information is stored in document portion appearance segments storage 306) of a recorded video (e.g., that was obtained by recorded video ingestion engine 302) during which document portion IDs were detected. In various embodiments, for each video segment of a recorded video in which document portion detection engine 304 had detected a document portion ID, document portion analysis engine 308 is configured to extract signals and/or metadata from that video segment. In a first example, document portion analysis engine 308 is configured to extract signals from the audio portion of the video segment during which a document portion ID has appeared. Example signals from the audio portion of a video segment may include applying machine learning to the audio to detect for the sentiment, confidence level, and/or clarity associated with each speaker during that video segment. In a second example, document portion analysis engine 308 is configured to extract signals from a text transcription of the audio portion of the video segment during which a document portion ID had appeared. Example signals from the text transcription of the audio portion of a video segment may include comparisons between the transcribed speech of the speakers in the video and metadata, notes, and/or textual content that is included in the document portion which is identified by that document portion ID. In a third example, document portion analysis engine 308 is configured to extract signals from the video frames of the video segment during which a document portion ID has appeared. Example signals from the video frames of a video segment may include comparisons between the OCR'ed characters that are derived from the video frames and the text that is included in the stored version of the document portion that corresponds to the document portion ID that has been detected in that video segment. Document portion analysis engine 308 is configured to store the signals extracted from video segments in which a document portion ID is detected in document portion analysis storage 310. Put another way, document portion analysis storage 310 can store, for each document portion ID, signals that have been extracted from video segments in which that document portion ID was detected.

In some embodiments, document portion analysis engine 308 is configured to generate visualizations that are derived from signals extracted from video segments (from one or more recorded videos) in which a document portion ID appears. Document portion analysis engine 308 can also present such visualizations at a user interface.

Recommendation engine 312 is configured to compare aggregated signals (e.g., stored at document portion analysis storage 310) extracted from video segments (across one or more recorded videos) in which a document portion ID appears against stored rules to generate recommendations to present to a creator associated with a document associated with the document portion ID and/or a meeting participant/host/presenter that was included in a video meeting in which the document portion ID was detected. In a first example, the extracted signals associated with a document portion ID may indicate that during recorded video-based meetings, designated words or phrases associated with the corresponding document portion ID have not often been said during the meetings and therefore the recommendation to be presented to historical and/or future meeting participants can remind the individuals to say the designated words or phrases during a later presentation/sharing of the document portion in a subsequent video-based meeting. In a second example, the extracted signals associated with a document portion ID may indicate the corresponding document portion is typically changed from a stored version of that document portion that is associated with the same document portion ID and therefore the recommendation to be presented to the creator of the associated document can remind the creator to update the stored version of the document to match what has been commonly said when that document portion was presented.

Figure 4:
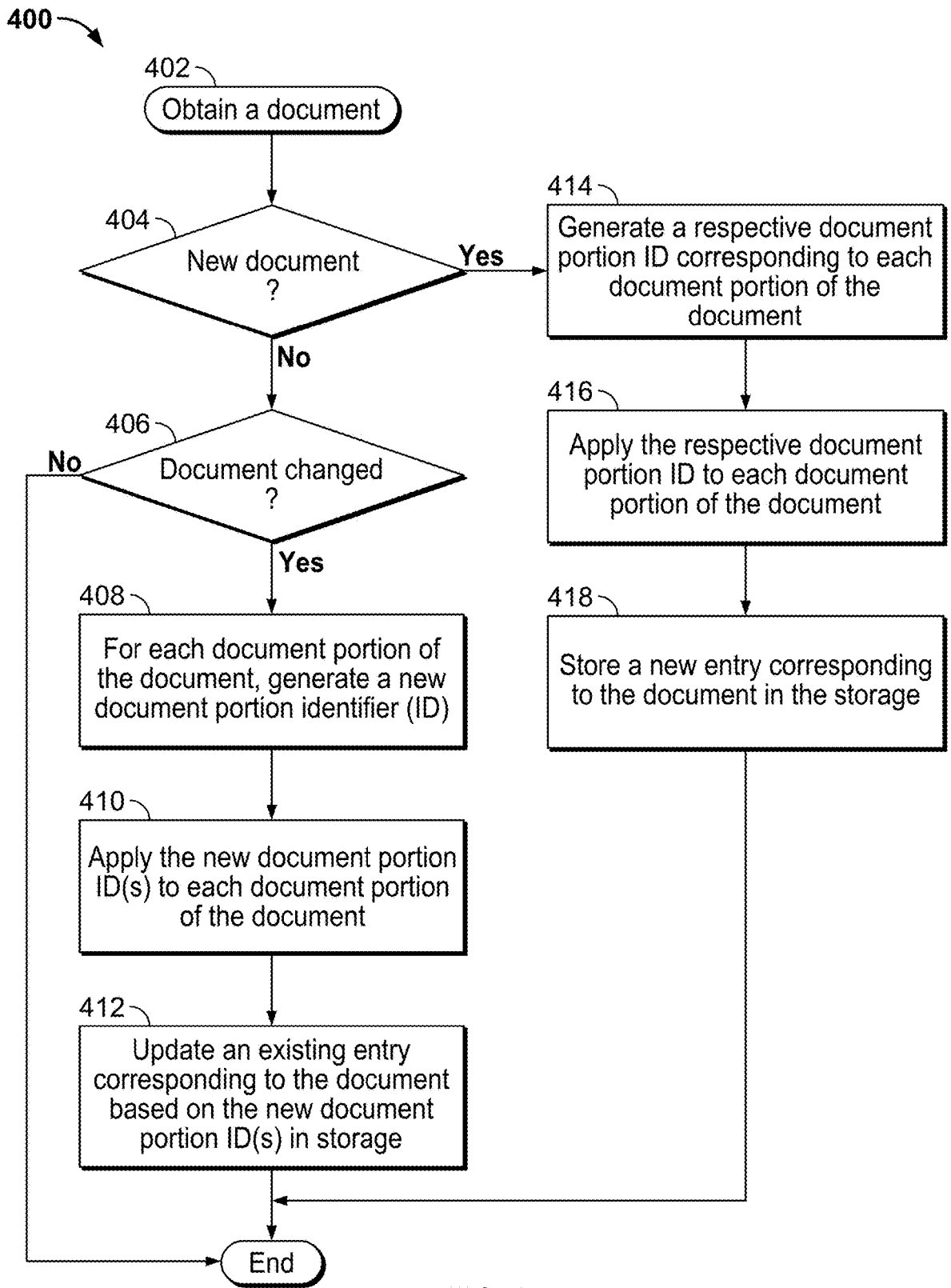
FIG. 4 is a flow diagram showing an example of a process for generating identifiers corresponding to document portions of a document in accordance with some embodiments.

FIG. 4 is a flow diagram showing an example of a process for generating identifiers corresponding to document portions of a document in accordance with some embodiments. In some embodiments, process 400 may be implemented, at least in part, by identifier generation server 102 and/or content identification server 112 of system 100 of FIG. 1.

At 402, a document is obtained. In some embodiments, the document is uploaded from a client device. In some embodiments, the document is generated via a browser-based document generation tool. In some embodiments, the document is uploaded to ensure that each document portion is appended with a corresponding document portion identifier (ID). In some embodiments, the document is uploaded to a central repository so that the document can be downloaded from the central repository by one or more devices.

At 404, whether the document is a new document is determined. In the event that the document is a new document, control is transferred to 414. Otherwise, in the event that the document is not a new document, control is transferred to 406. In various embodiments, the document is "new" if there is no entry that corresponds to that document in the database because the ID generation server (or another entity) had not previously added document portion ID(s) to at least one document portion of the document. In a first example, a document is newly created and then uploaded to the ID generation server and therefore includes no document portion ID. The document of the first example is considered "new." In a second example, a document could have been previously uploaded to the ID generation server and may or may not have been modified either (offline) locally at a client device or at the browser-based document generation tool that is provided by the ID generation server. The document in this second example is considered not "new" but rather is a "changed" version of a previously processed document. In some embodiments, a document is considered "new" if there is no entry stored in the database that matches the identifying information (e.g., filename or other attribute) of the document.

At 406, whether the document has changed is determined. In the event that the document is determined to have changed, control is transferred to 408. Otherwise, in the event that the document is determined to not have changed, process 400 ends because no new document portion ID needs to be generated or added to the document. If the document is not new, then a stored version of the document (e.g., a stored document with the same filename as the obtained document) can be retrieved from storage to compare against the obtained document to determine whether any changes or additions have been made to the document. For example, the obtained document can be compared to the stored version of the document (e.g., at the document portion-level) to determine whether the obtained document includes any updated content on a stored version of a document portion and/or whether the obtained document includes any new document portions that were not included in the stored version. The obtained document is considered to have "changed" if the obtained document includes at least one document portion with changed content (relative to the stored version) and/or if the obtained document includes at least one new or one fewer document portion than the stored version. The obtained document and the stored version of the document can be compared using any appropriate document comparison technique.

In some embodiments, in the event that the document is determined to have "changed," each document portion of the document that includes updated content relative to its stored version and/or each new document portion that was added to the document is determined.

Figure 5:
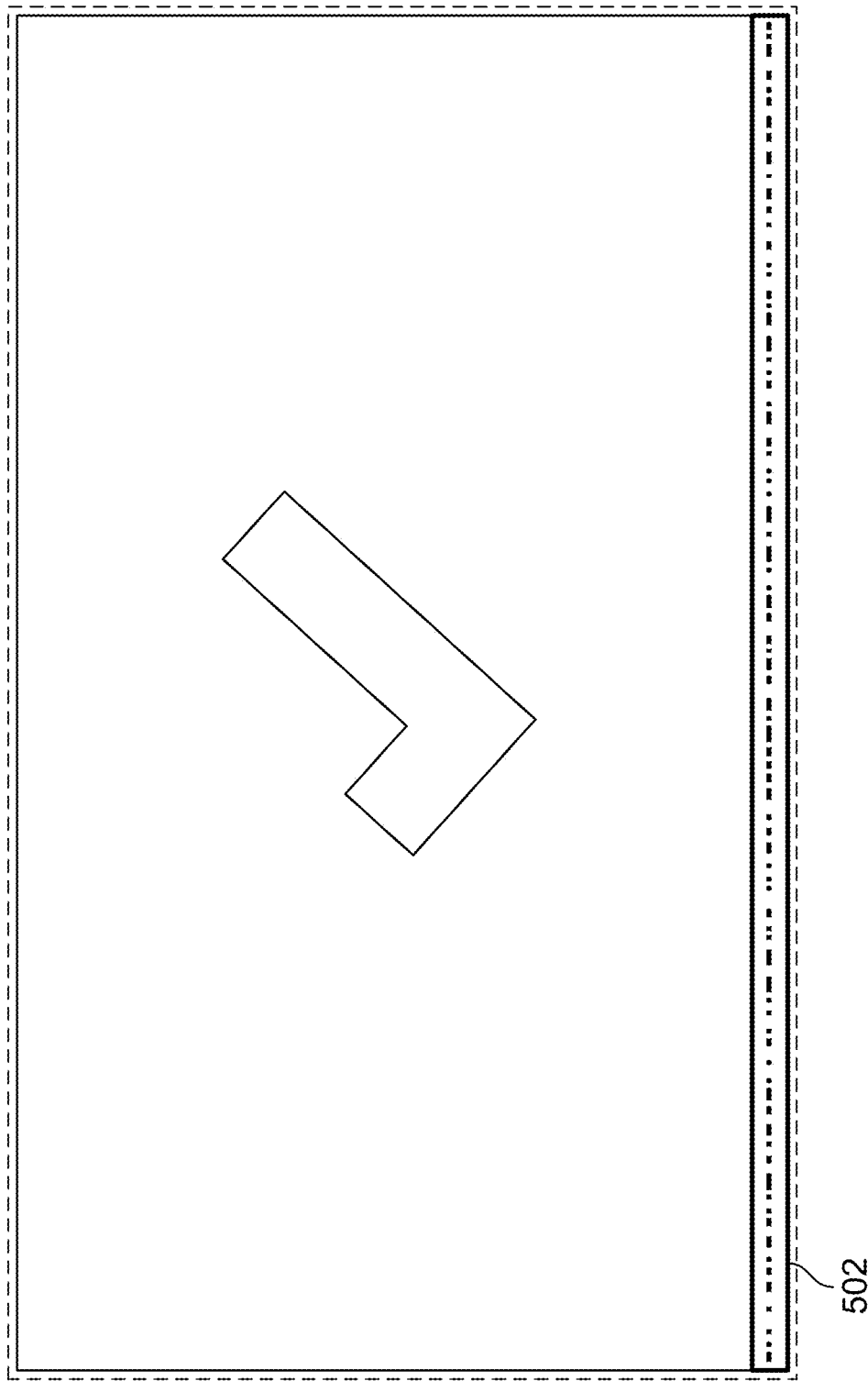
FIG. 5 is a diagram showing an example type of a document portion identifier that has been appended to a document portion comprising a slide from a slideshow in accordance with some embodiments.

At 408, for each document portion of the document, a new document portion ID is generated. In some embodiments, a new document portion ID is generated (or an already generated document portion ID is otherwise obtained from another server that had generated the ID) for each document portion of the changed document. In some embodiments, the document portion ID of a document portion is determined as a function of the content (e.g., text and/or images) on that document portion. In some embodiments, the document portion ID of a document portion is determined randomly, irrespective of the content (e.g., text and/or images) on that document portion. In some embodiments, the document portion ID of a document portion is determined to uniquely identify the document portion within its corresponding document and/or across multiple documents. In some embodiments, the document portion ID is a discreet code that can be applied to different types of document/media, and discernable in screen capture/recording provided by different video-based meeting service providers. In some embodiments, a document portion ID can be detected on a document portion (or a screen capture of or video frame showing the document portion) by analyzing pixel patterns. FIG. 5 below shows an example type of document portion ID that comprises a Code 128 compliant barcode.

Returning to FIG. 4, at 410, the new document portion ID(s) are applied to each document portion of the document. In some embodiments, a new document portion ID that is generated for each document portion is appended to that document portion by, for example, overlaying the document portion ID over a small portion of the content on the document portion. In some embodiments, a new document portion ID that is generated for a document portion is appended to that document portion by, for example, overlaying the new document portion ID over the previous document portion ID that had been appended to that document portion.

Put another way, each time that content is detected to have changed with respect to a document that was previously uploaded to the ID generation server, a new, unique document portion ID is generated and then appended to each document portion (regardless if a change was detected with respect to that particular document portion) of that document to replace a previously appended document portion ID, if any. In some embodiments, a document portion ID is appended near the bottom of the document portion so as to minimize the amount of content on the document portion that is covered by the ID and/or avoid drawing user attention to the ID (e.g., when the document portion is shared/viewed by a user).

At 412, an existing entry corresponding to the document is updated based on the changed/new document portion ID(s) in storage. In various embodiments, due to a previous version of the document already having been processed by the ID generation server, an existing entry that includes information associated with the document was previously created in a database. For example, the existing entry may include one or more of the following: a filename associated with the document, a type associated with the document, a respective document portion ID (or the alphanumeric value encoded by that ID) corresponding to each document portion of the document, the last time that the document was uploaded to the ID generation server, information identifying the last user that had modified the document, and data that describes one or more other versions of the document (if any). For example, each version of the document may have a corresponding entry created for it in the database.

Based on new document portion IDs having been generated and appended for the uploaded version of the document, the existing entry corresponding to a previous version of the document can be queried and updated at the database. For example, updating the existing entry may include storing data that denotes the existence of a new version of the document, the document portion IDs that are associated with the document portions of the new version of the document, information identifying the last user that had modified the document, and the time at which the new version of the document was last modified.

In addition to leveraging these embedded document portion IDs as a way of identifying the content in recorded media, the document portion IDs can also be leveraged to determine document portion heritage/lineage. As document portion IDs are added to document portions, when a document portion is downloaded from the ID generation server, modified, then re-uploaded to the ID generation server, the document portion ID can again be decoded and the document portion compared with the original content to determine content modifications via OCR and content extraction and comparison techniques. Once the level of modification has been determined, metadata about the changes can be stored in the database. In some embodiments, based on the level of change, an alert and workflow processes can be created to trigger content reviews and determine if the change warrants additional review or approval. Once the change is fully rationalized, in some embodiments, the new document portion will obtain its own document portion ID, but the ID generation server can maintain the lineage information (e.g., that the new document portion is a revised version of another document portion) for the document portion such that full auditability is maintained.

Returning to 414, a respective document portion ID corresponding to each document portion of the document is generated. In some embodiments, a new document portion ID is generated (or an already generated document portion ID is otherwise obtained from another server that had generated the ID) for each document portion of the new document.

At 416, the respective document portion ID is applied to each document portion of the document. In some embodiments, a new document portion ID that is generated for a document portion is appended to that document portion by, for example, overlaying the new document portion ID over a small portion of the content on the document portion (e.g., near the bottom of the document portion).

At 418, a new entry corresponding to the document is stored in the storage. Because the document is "new," no corresponding entry was previously stored at the database. As such, a new database entry corresponding to the new document is created in the database. For example, the new database entry may include one or more of the following: a filename associated with the document, a type associated with the document, a respective document portion ID (or the alphanumeric value encoded by that ID) corresponding to each document portion of the document, the time that the document was uploaded to the ID generation server, and information identifying the last user that had modified the document.

FIG. 5 is a diagram showing an example type of a document portion identifier that has been appended to a document portion comprising a slide from a slideshow in accordance with some embodiments. The example of FIG. 5 shows a document portion identifier (ID) that is highlighted by box 502. In the example of FIG. 5, the document portion ID within box 502 comprises a Code 128 compliant barcode (which comprises a series of black dashes) that has been appended to the bottom of each page of a document. In some embodiments, document portion IDs that are appended by an ID generation server (e.g., ID generation server 102 of system 100 of FIG. 1) and added to document portions of a document (e.g., in a process such as process 400 of FIG. 4) comprise Code 128 class of barcodes. For example, a Code 128 compliant barcode can be generated by calling and passing parameters (e.g., barcode height, barcode width, foreground color, background color, trim) to a python-barcode package. Also, for example, the generated Code 128 compliant barcode can be edited (e.g., cropped) using an imaging library (e.g., PIL—Python Imaging Library) before being appended to a document portion. In some embodiments, the Code 128 compliant barcode is generated to include a certain contrast between the foreground and background colors so that the barcode in the foreground will still be detectable when the barcode is reduced in size and/or included in a screen capture/video frame.

Some advantages of a Code 128 compliant barcode are that they are minimally affected by the natural distortion and compression that may take place in low quality video capture, which is prevalent in recorded online meetings. The large horizontal scaling with relatively low vertical size requirements of a Code 128 barcode make it a good candidate for minimally invasive content identification. While the barcode is still clearly visible to the human eye, it is subtle enough to not materially interfere with the primary content of a document portion on which it is appended.

As shown in FIG. 5, the example Code 128 compliant barcode spans the entire width of the slide, but only requires a few pixels of height. This barcode is encoding 24 characters, however, it can handle up to an unlimited number of characters. A common implementation with 48 characters is sufficient to identify 5.04e74 unique document portions (e.g., slides, pages, or video frames/segments).

The technique chosen for identification must support scaling and arbitrary positioning since a common use case is to extract the document portion ID from online video-meeting presentations where the meeting participant that is presenting the content may place the content arbitrarily on his or her screen. There is no requirement for the meeting participant to open a document in a full screen mode, hence the document portion ID may be located almost anywhere in the recorded video stream. The Code 128 barcode is relatively immune to scaling and positioning due to its moderate density binary encoding. In order to accurately detect a Code 128 barcode, the detection must only be able to identify the minimum bar width and divide the image into equal parts of the same width and have enough contrast between the foreground and background to create the binary barcode representation. If the barcode is extracted and the checksum passes, the reliability of the extraction is very high.

The use of a barcode (such as a Code 128 compliant barcode) as the type of document portion ID also allows for a variety of foreground colors to be used for the barcode. Over 2,000 different foreground and background color combinations were tested and verified to have sufficient contrast to be accurately detected with grey tones as light as rgb (200,200,200) being detected successfully on white background.

A document portion ID such as a Code 128 compliant barcode can be added to document portions of a document differently depending on the document type. For the document types of slideshows, sets of images, word processing documents, and PDFs, the document portion ID can be appended to each document portion such as a slide, image, or page. For the document type of a video, the document portion ID can be appended to a video frame from each document portion that comprises a subset of video frames (video segment) or the same document portion ID can be appended to each video frame that is associated with the same document portion that comprises a subset of video frames (video segment).

A Code 128 compliant barcode as shown in FIG. 5 is just one example document portion ID and in practice, other types of IDs can be generated for and appended to document portions of a document. Other examples of document portion IDs include other types of barcodes or a QR code.

Figure 6:
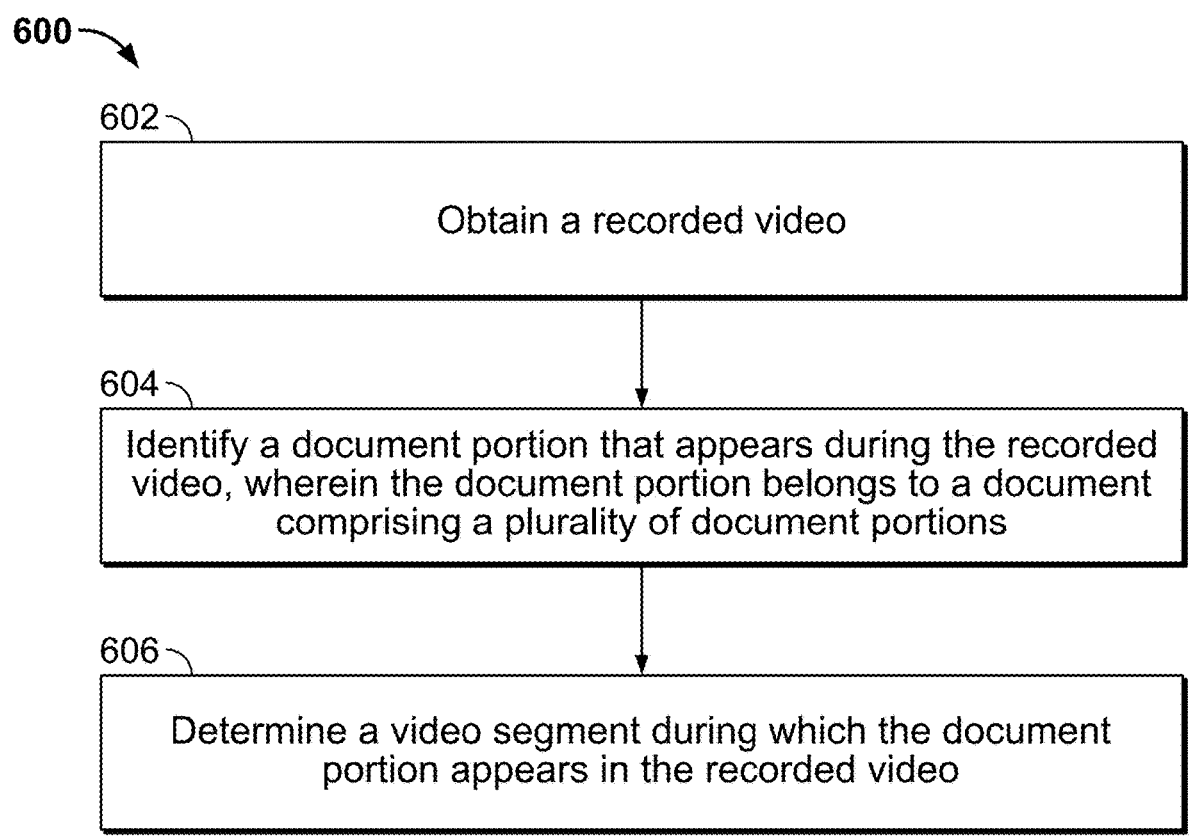
FIG. 6 is a flow diagram showing an embodiment of document portion identification in a recorded video.

FIG. 6 is a flow diagram showing an embodiment of document portion identification in a recorded video. In some embodiments, process 600 may be implemented, at least in part, by content identification server 112 of system 100 of FIG. 1.

At 602, a recorded video is obtained. In some embodiments, the recorded video comprises a recorded video-based meeting and is obtained from the videotelephony meeting platform with which it was recorded. In some embodiments, the recorded video comprises a screen recording of a computer screen.

At 604, a document portion that appears during the recorded video is identified, wherein the document portion belongs to a document comprising a plurality of document portions. In various embodiments, a document portion that appears during the recorded video is identified by its corresponding document portion identifier (ID). In various embodiments, at least a subset of the video frames of the recorded video is scanned to determine the presence of a document portion ID on the video frames. For example, the presence of a document portion ID can be detected in a video frame by analyzing portions of the video frame for pixel patterns that are associated with the type of document portion ID that is being detected. As described in FIG. 5, a Code 128 compliant barcode is one specific example of a type of document portion ID. In the event that a document portion ID is detected in a video frame, then it is determined that the document portion of a document to which the document portion ID has been assigned (e.g., according to mappings between document portions of a document and document portion IDs) is shown, shared, and/or presented in that location of the video. As such, video frames/locations of the recorded video during which a document portion's document portion ID appears can be attributed to the appearance of that document portion during those video frames/locations.

At 606, a video segment during which the document portion appears in the recorded video is determined. Video frames of the recorded video can be reviewed in the chronological order in which they appear within the video to determine the approximate video frames/locations during which a detected document portion ID appears within the recorded video. Reviewing the video frames will result in determinations of video segments (which can be defined by start timestamps and end timestamps) within the recorded video during which a detected document portion ID appears within the recorded video. It is possible for the same detected document portion ID to appear in more than one video segment in the video, for example, due to the document portion corresponding to that ID appearing more than once in the recorded video. For example, a presenter user can share a document portion on his or her screen during a video meeting that is included in the recorded video at one point in the meeting, share another document portion, and then return to sharing the first document portion at a second point in the meeting. In various embodiments, the video segment(s) during which a detected document portion ID can be detected within the recorded video are collectively referred to as the "timeline" corresponding to the document portion ID within the recorded video.

Figure 7:
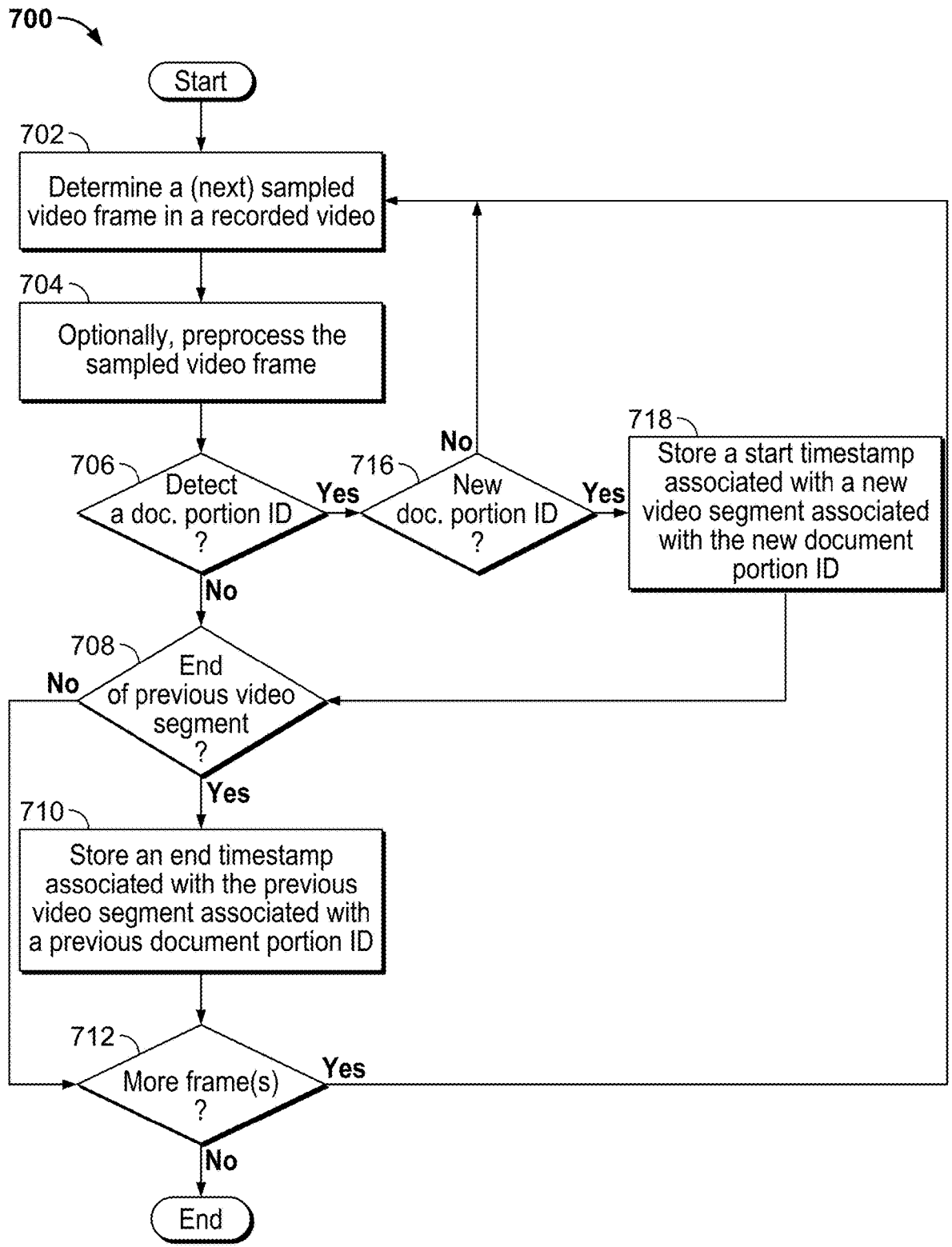
FIG. 7 is a flow diagram showing an example process for content identifying in accordance with some embodiments.

FIG. 7 is a flow diagram showing an example process for content identifying in accordance with some embodiments. In some embodiments, process 700 may be implemented, at least in part, by content identification server 112 of system 100 of FIG. 1.

Process 700 describes an example process of analyzing at least a subset (sample) of video frames in a recorded video in the chronological order in which they appear within the video to determine the locations/video segments in which document portion identifiers (IDs), if any, appear in the video.

At 702, a (next) sampled video frame in a recorded video is determined. In some embodiments, given that it would be very computationally inefficient and time consuming to review every single video frame of a recorded video, only a subset of all the video frames in the video is selected as a sample of video frames through which to scan/detect for the presence of document portion IDs. The sample of video frames can be determined using any appropriate technique.

In a first example technique of determining the sample, certain video-based meeting platforms provide a recorded video as more than one file, including a file that is specific to screen shares and this file is used to determine the sampled video frames. This file that is specific to screen shares includes video frames that show either a screen share (e.g., a presentation of the screen of the meeting participant that is currently sharing a document or his/her screen with the other meeting participants) when a screen was shared at the timestamp associated with that video frame, or a predetermined color (e.g., black) when a screen was not shared at the timestamp associated with that video frame. Put another way, this screenshare-specific file does not include video footage of meeting participants. In this first example technique, each video frame that includes a screen share from the screen share-specific file is determined to be a sampled video frame.

In a second example technique of determining the sample, unique video frames from the recorded videos are first determined and these unique video frames form the sample of video frames for document portion ID detection. A "unique" video frame is one that is determined to be unique relative to other temporally proximate video frames. In the example use case of video recordings of meetings, a video frame may include the video feed of each participant in the meeting. The location of the participants' video feeds in the video frames may be known and so in the determination of unique video frames, a bounding box that includes potentially shared screen content but excludes the known area on the video frame in which the participants' video feeds are located may be used to detect "unique" video frames relative to their temporal video frame neighbors.

In a third example technique of determining the sample, each video frame at a predetermined interval of the recorded video is selected as a sampled video frame. For example, the video frame every five seconds since the beginning of the recorded video can be determined to be a sampled video frame.

However sampled video frames are determined, and once they have been determined, each sampled video frame is evaluated (in the chronological order in which the video frames appear within the recorded video, starting with the sampled video frame that is associated with the earliest timestamp in the video), as will be described below, to determine whether the video frame includes a document portion ID.

At 704, optionally, the sampled video frame is preprocessed. In some embodiments, the sampled video frame is optionally preprocessed before it is scanned for a document portion ID such that the preprocessed video frame will constrain the scan to fewer than all pixels of the video frame, limit the scan to only a portion of the video frame, or will otherwise speed up the scan. In a first example of preprocessing, the sampled video frame can be cropped such that areas other than the region of the video frame in which a document portion ID would have been appended can be removed. In a second example of preprocessing, pixels of the sampled video frame whose RGB (red green blue) values meet or exceed a given threshold are filtered out so that the scan can focus on the remaining pixels.

At 706, whether a document portion ID is detected in the sampled video frame is determined. In the event that a document portion ID is detected in the sampled video frame, control is transferred to 716. Otherwise, in the event that a document portion ID is not detected in the sampled video frame, control is transferred to 708. In various embodiments, the (optionally, preprocessed) sampled video frame is scanned for pixel patterns that are consistent with a known type of document portion ID that had been appended (e.g., by an ID generation server) to the document portions. For the specific example of the type of the document portion ID being a Code 128 compliant barcode (e.g., such as shown in the example of FIG. 5), the Pyzbar library can be called to perform an efficient scan of the video frame to detect the presence of a Code 128 compliant barcode, if any.

For example, a sampled video frame may include no document portion ID if that video frame does not include a screen share or if that video frame includes a screen share but not of a document that includes a document portion ID.

At 716, whether the detected document portion ID comprises a new document portion ID is determined. In the event that the detected document portion ID is a new document portion ID, control is transferred to 718. Otherwise, in the event that the detected document portion ID does not comprise a new document portion ID, control is returned to 702. In the event that a document portion ID of the known type was detected at step 706, then it is determined whether the detected document portion ID is "new." For example, the detected document portion ID can be "new" if no document portion ID had been previously detected in the recorded video or if the document portion ID is different than the last detected document portion ID for which a video segment is currently being determined. Put another way, a detected document portion ID can be "new" if it is different than the document portion ID for which the start timestamp of a video segment in the recorded video has been determined but for which an end timestamp has not yet been determined.

At 718, a start timestamp associated with a new video segment associated with the new document portion ID is stored. In response to the detection of a new document portion ID, then it is determined that the current sampled video frame is associated with the start of a video segment within the recorded video that includes the new document portion ID and therefore, the start timestamp of this new video segment associated with the new document portion ID is to be stored.

At 708, whether the end of a previous video segment has been detected is determined. In the event that the end of a previous video segment has been detected, control is transferred to 710. Otherwise, in the event that the end of a previous video segment has not been detected, control is transferred to 712. In a first example in which the end of the previous video segment is detected and for which the start timestamp had been previously stored, the current sampled video frame includes no document portion ID, meaning that the video segment that had included the last detected document portion ID had ended. In a second example in which the end of the previous video segment is detected and for which the start timestamp had been previously stored, the current sampled video frame includes a different/new document portion ID, meaning that the video segment that had included the last detected document portion ID had ended and now a new video segment for the new detected document portion ID had started.

At 710, an end timestamp associated with the previous video segment is stored. Returning to the first example above in which the current sampled video frame includes no document portion ID, meaning that the video segment that had included the last detected document portion ID had ended, an end timestamp is stored for the video segment associated with the last detected document portion ID. Returning to the second example above in which the current sampled video frame includes a different/new document portion ID relative to the last detected document portion ID, an end timestamp is stored for the video segment associated with the last detected document portion ID.

At 712, whether there is at least one more sampled video frame to review is determined. In the event that there is at least one more sampled video frame to review, control is returned to 702. Otherwise, in the event that there are no more sampled video frames to review, process 700 ends.

At the completion of process 700, information associated with (e.g., the respective start and end timestamps of) the one or more video segments corresponding to each of the document portion IDs that had appeared/been detected in the recorded video is stored so that the locations in the video in which such document portion IDs appear can be identified using the video segment information.

One advantage to adding/assigning a new, unique document portion ID to a new or changed document portion of a document (e.g., such as was performed in process 400 of FIG. 4) is that the document portion can be uniquely identified by its appended document portion ID when the document portion appears within a screen capture or video frame that shows the document portion (e.g., as described in process 700 of FIG. 7). Often, when a document portion is shared during a recorded video-meeting, the appearance of the document portion may be augmented in a screen capture/video recording due to a scaling of the document portion (e.g., the document portion's dimensions are compressed to cover less than the full width of the screen) or due to a lowered resolution of the video-meeting (e.g., due to a degraded network connection). However, by selecting a document portion ID (e.g., such as a Code 128 compliant barcode) that is minimally detrimentally affected (e.g., distorted) by scaling/compression, the later analysis/identification of the corresponding document portion in a recorded video/screen capture does not need to rely on recognition of all of the image/text content on the document portion but rather, can rely on just the document portion ID appended thereof. To be able to rely on identifying a document portion ID to uniquely identify a document portion that appears within a recorded video/screen capture is especially helpful when the same document portion (with the same document portion ID) appears within different video frames/screen captures but the video frames/screen captures include content that is not part of the document portion. In the example application of identifying document portions within a recorded video-based meeting, different video frames that include appearances of the same document portion (with the same document portion ID) may include a mouse cursor that appears at different locations over the shared/presented document portion. Also, in the example application of identifying document portions within a recorded video-based meeting, different video frames that include appearances of the same document portion (with the same document portion ID) may also include different video feeds/images of the meeting participants (as recorded through their respective cameras). Furthermore, in the example application of identifying document portions within a recorded video-based meeting, different video frames that include appearances of the same document portion (with the same document portion ID) may show the same document portion in different sizes/dimensions (e.g., the participant that is sharing the document portion may shrink or enlarge the application through which the document portion is shared while, potentially, simultaneously sharing other applications on the same screen). A conventional technique of content identification that generates a fingerprint (e.g., an image hash or neural network-based representation) based on the entirety of the content in a video frame may potentially generate two different fingerprints for two video frames that show the same document portion in different sizes or include different content other than the document portions (e.g., different cursor locations or different image captures of the meeting participants' video feeds). As such, the conventional content identification technique of fingerprinting is inadequate to enable the identification of document portions that may appear across multiple video frames with potentially different presentations of content other than the document portions themselves.

Figure 8:
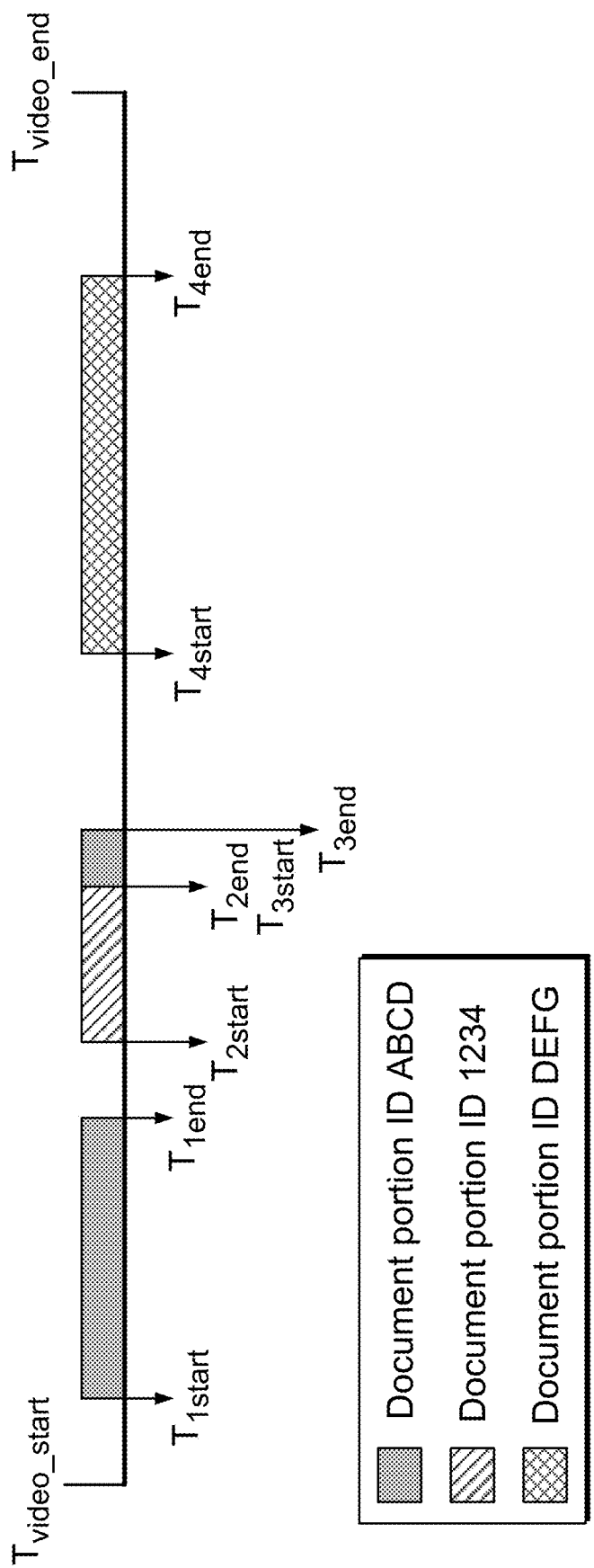
FIG. 8 is a diagram showing video segments corresponding to three different document portion IDs that were detected within a recorded video.

FIG. 8 is a diagram showing video segments corresponding to three different document portion IDs that were detected within a recorded video. The example timeline shown in FIG. 8 shows that a recorded video starts at time $T_{video\_start}$ and ends at time $T_{video\_end}$. A process of content identification (e.g., such as process 700 of FIG. 7) can be applied to analyze at least a portion of the video frames of the recorded video to determine the locations during which document portion IDs of a known type (e.g., a code 128 compliant barcode) appear within the recorded video. Specifically, each portion/location of the recorded video during which a document portion ID (and therefore, the ID's corresponding document portion) appears is a video segment associated with that document portion ID and that is defined by a corresponding start timestamp and end timestamp.

Referring to the example of FIG. 8, three different document portion IDs are detected within the (sampled) video frames of the recorded video. In the example of FIG. 8, these document portion IDs are document portion ID "ABCD," document portion ID "1234," and document portion ID "DEFG." Based on the content identification process, document portion ID "ABCD" is determined to appear within two video segments in the recorded video: a first video segment that is defined by start timestamp $T_{1start}$ and end timestamp $T_{1end}$, and a second video segment that is defined by start timestamp $T_{3start}$ and end timestamp $T_{3end}$. Assuming that the recorded video comprises a recording of an online video-meeting, document portion ID "ABCD" has been detected within two video segments because the document portion (e.g., page, slide, video segment) associated with that ID "ABCD" could have been presented during one segment of the meeting, not presented during another segment of the meeting (as another document portion was presented), and then presented again during yet another segment of the meeting. Document portion ID "1234" is determined to appear within one video segment in the recorded video that is defined by start timestamp $T_{2start}$ and end timestamp $T_{2end}$. Assuming that the recorded video comprises a recording of an online video-meeting, the end timestamp $T_{2end}$ of the video segment associated with document portion ID "1234" could match or be close to the start timestamp $T_{3start}$ of the video segment associated with document portion ID "ABCD" because the two document portions could have been shared/presented adjacently in time during the meeting. Document portion ID "DEFG" is determined to appear within one video segment in the recorded video that is defined by start timestamp $T_{4start}$ and end timestamp $T_{4end}$. Video segments/portions of the recorded video in which no document portion IDs (of the known type) are detected may not include an appearance/sharing/presentation of a document portion at all or include the appearance/sharing/presentation of a document portion of a type that is not being detected by the content identification server.

Figure 9:
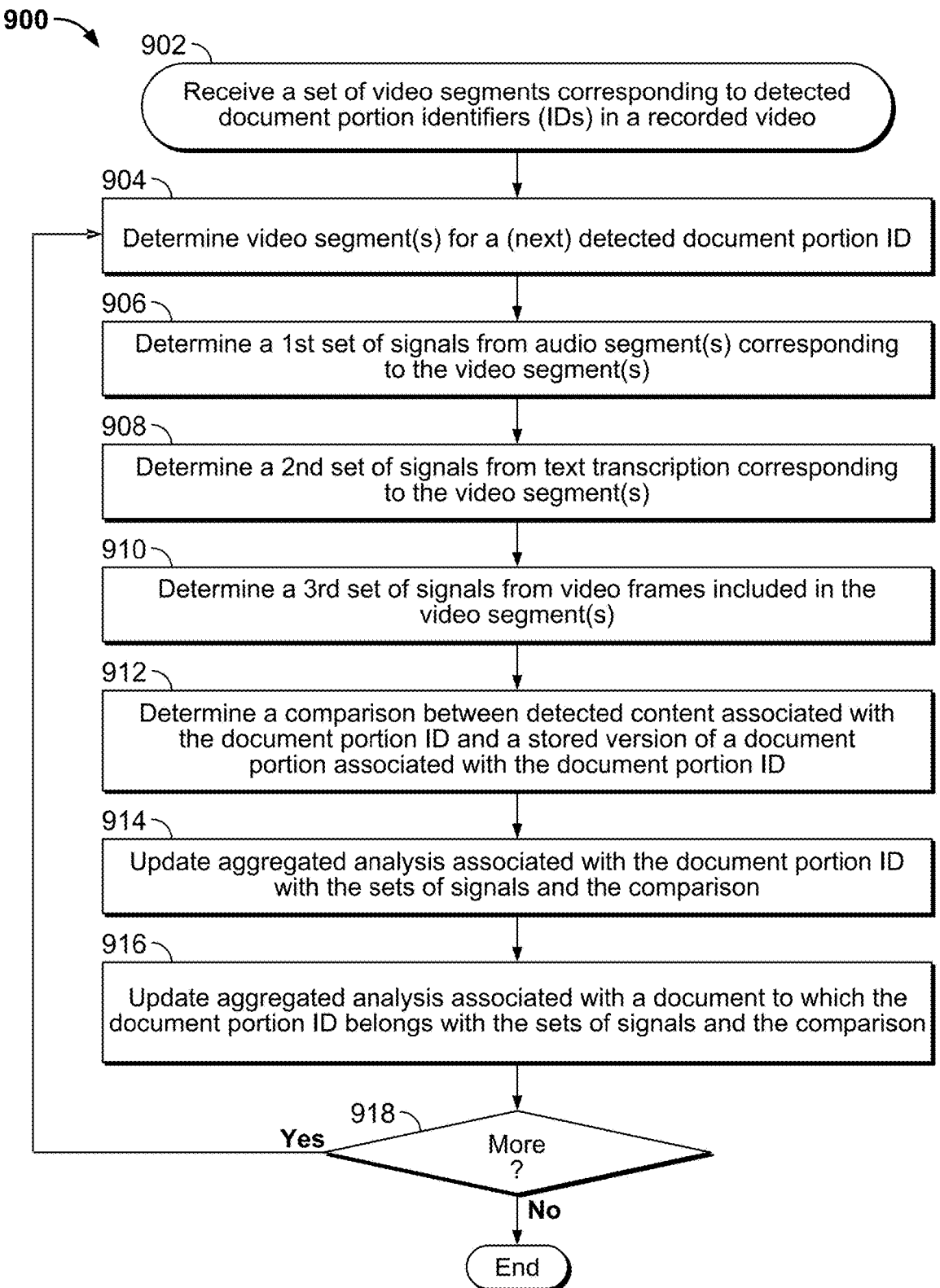
FIG. 9 is a flow diagram showing an example process for analyzing video segments corresponding to document portion identifiers in accordance with some embodiments.

FIG. 9 is a flow diagram showing an example process for analyzing video segments corresponding to document portion identifiers in accordance with some embodiments. In some embodiments, process 900 may be implemented, at least in part, by content identification server 112 of system 100 of FIG. 1.

At 902, a set of video segments corresponding to detected document portion identifiers (IDs) in a recorded video is received. In some embodiments, the set of video segments corresponding to detected document portion IDs in a recorded video is determined by a process such as process 700 of FIG. 7. Each video segment in the set is identified by at least a start timestamp and an end timestamp within the recorded video and also the document portion ID that was detected within the (sampled) video frames that were included in that video segment.

At 904, video segment(s) are determined for a (next) detected document portion ID. The one or more video segments associated with each document portion ID in the set are evaluated in steps 906 through 912, below.

At 906, a first set of signals is determined from audio segment(s) corresponding to the video segment(s). Machine learning can be applied to the audio portions of the video segments associated with the document portion ID in question to extract one or more audio-related signals. In some embodiments, the audio portion of a video segment includes different channels of audio corresponding to different speakers. For example, machine learning can be applied to the audio portion of video segment(s) associated with the document portion ID in question to determine an emotion (e.g., anger, happiness, sadness), a confidence level (e.g., which is determined based on how frequently filler words like "um" are used), and clarity (e.g., whether words were clearly enunciated) with respect to the speech uttered by each respective speaker.

At 908, a second set of signals is determined from text transcription corresponding to the video segment(s). Machine learning can be applied to the text transcription of the audio portions of the video segments associated with the document portion ID in question to extract one or more text-related signals. In some embodiments, the text transcription of the audio portion of a video segment can attribute speech to different speakers. For example, machine learning can be applied to the text transcription of the audio portion of video segment(s) associated with the document portion ID in question to determine what questions were asked, what topics were discussed, and what phrases were used with respect to the speech uttered by each respective speaker.

At 910, a third set of signals is determined from video frames included in the video segment(s). Machine learning can be applied to the video frames of the video segments associated with the document portion ID in question to extract one or more video-related signals. For example, machine learning can be applied to adjacent video frames of video segment(s) associated with the document portion ID in question to determine whether the footage of meeting participants indicates that they were paying attention and where a mouse cursor was pointing to the document portion associated with the document portion ID.

At 912, a comparison is determined between detected content associated with the document portion ID and a stored version of a document portion associated with the document portion ID. In some embodiments, a comparison is made between the content that appears in one or more video frames that is included in a video segment associated with a document portion ID and a stored version of the document portion corresponding to that same document portion ID. As mentioned above, a database (or a Blob/file storage) can store entries that include mappings among at least a document, the document's document portions, and the portions' respective document portion IDs. As such, a stored version of the document portion that is identified by the detected document portion ID in question can be retrieved from storage and compared against the content in the video frame that is detected to be associated with the document portion to determine whether there are any differences. For example, a user can download a document with appended document portion IDs (e.g., from an identifier generation server such as identifier generation server 102 of system 100 of FIG. 1) and then make local ("offline") changes to some document portions thereof (e.g., to customize the document for a new audience) without uploading the updated document back to the identifier generation server (e.g., due to a lack of opportunity, time, or internet connection). In this case, due to the offline updating of the document, at least some of its document portions may include updated content (e.g., text/images) but with document portion IDs that had been appended to them prior to the update. As such, the offline updating of the document would have caused the revised document portion(s) thereof to differ from the stored versions.

By comparing the document portion that is detected in a video frame that is associated with a document portion ID to the stored version of the document portion that is associated with the document portion ID, it can be determined whether the corresponding document had been modified offline.

At 914, aggregated analysis associated with the document portion ID is updated with the sets of signals and the comparison. The extracted audio-related signals, text-related signals, video-related signals extracted from video segments associated with a document portion ID detected in a particular recorded video, and the comparison with the stored version of the associated document portion are combined/aggregated with signals extracted from video segments from other recorded videos, if any, associated with the same document portion ID to determine aggregated document portion-level analytics.

At 916, aggregated analysis associated with a document to which the document portion ID belongs is updated with the sets of signals and the comparison. The extracted audio-related signals, text-related signals, video-related signals extracted from video segments associated with a document portion ID detected in a particular recorded video, and the comparison with the stored version of the associated document portion are combined/aggregated with signals extracted from video segments from other recorded videos, if any, associated with the document to which the document portion ID belongs to determine aggregate document-level analytics.

At 918, whether there is at least one more document portion ID in the set on which to perform analysis is determined. In the event that there is at least one more document portion ID in the set on which to perform analysis, control is returned to 904. Otherwise, in the event that there are no more document portion IDs in the set on which to perform analysis, process 900 ends.

Figure 10:
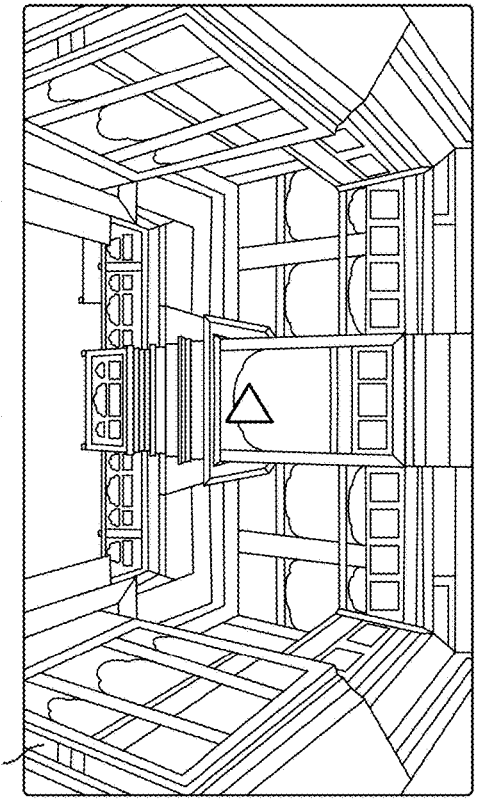
FIG. 10 is a diagram showing an example of a user interface that presents information associated with video segments in a recorded video that have been determined to include a document portion identifier.

FIG. 10 is a diagram showing an example of a user interface that presents information associated with video segments in a recorded video that have been determined to include a document portion identifier. The example user interface that is shown in FIG. 10 may be represented after a content identification process (e.g., such as process 700 of FIG. 7) was applied to a recorded online, video-meeting to detect for the presence of a known type of document portion identifier. For example, the user interface of FIG. 10 can be presented to a user that is reviewing a recorded video stream for quality assurance for at least the performance of at least one of the meeting participants. In a specific use case, at least one of the meeting participants is a sales representative and the meeting was intended to provide a sales pitch to one or more potential buyers. In addition to presenting media player 1008 in which the recorded video stream can be played back, analytics of which meeting participant spoke and when are shown is section 1010 of the user interface. Given that the document portion identifiers that appear within the recorded video have already been detected (e.g., using a process such as process 700 of FIG. 7), they can be decoded back into values that can be used to determine their corresponding document portions using mapping information stored at the database. In the example of FIG. 10, each document portion for which a corresponding document portion identifier was detected during the recorded video has a respective title. Under activity section 1012, which describes activities/events that occurred during the meeting, activities 1002, 1004, and 1006 each describe the appearance of a particular document portion whose corresponding document portion ID was (first) detected at a corresponding timestamp in the recorded video. In addition to identifying document portion IDs, activities 1002, 1004, and 1006 also identify the meeting participant that had presented the corresponding document portions. The identification of the meeting participants could come from the metadata of the recorded video file, which may include the information as to the participants of the meeting, as well as the actions taken by the participants. This metadata of the recorded video file includes who and when someone is screen-sharing. So the time intervals of when someone is screen-sharing can be aligned to video segments associated with detected document portion IDs to determine who was sharing a particular detected document portion ID. As shown in the example user interface, activity 1002 describes the presentation of the document portion titled "Product Overview" and the time 12:24 pm on Sep. 30, 2022 at which it was presented during the recorded meeting, activity 1004 describes the presentation of the document portion titled "Building World Class Products" and the time 12:18 pm on Sep. 30, 2022 at which it was presented during the recorded meeting, and activity 1006 describes the presentation of the document portion titled "Why ACME" and the time 12:15 pm on Sep. 30, 2022 at which it was presented during the recorded meeting.

For example, in response to a user selection of an activity such as activities 1002, 1004, and 1006, the playback of the recorded meeting can skip to the corresponding timestamp such that a reviewing user can view the particular video segment of the recording in which the corresponding document portion ID appeared/was detected. Also, while not shown in the example user interface of FIG. 10, a similar user interface can present document portion-specific analysis (e.g., extracted signals) that is derived from the video segments of the recorded video in which the corresponding document portion ID was detected. Moreover, while not shown in the example user interface of FIG. 10, a similar user interface can present a visualization of a timeline of locations (e.g., video segments) (similar to the example shown in FIG. 8) within the recorded video at which a document portion ID had been detected to appear.

Figure 11:
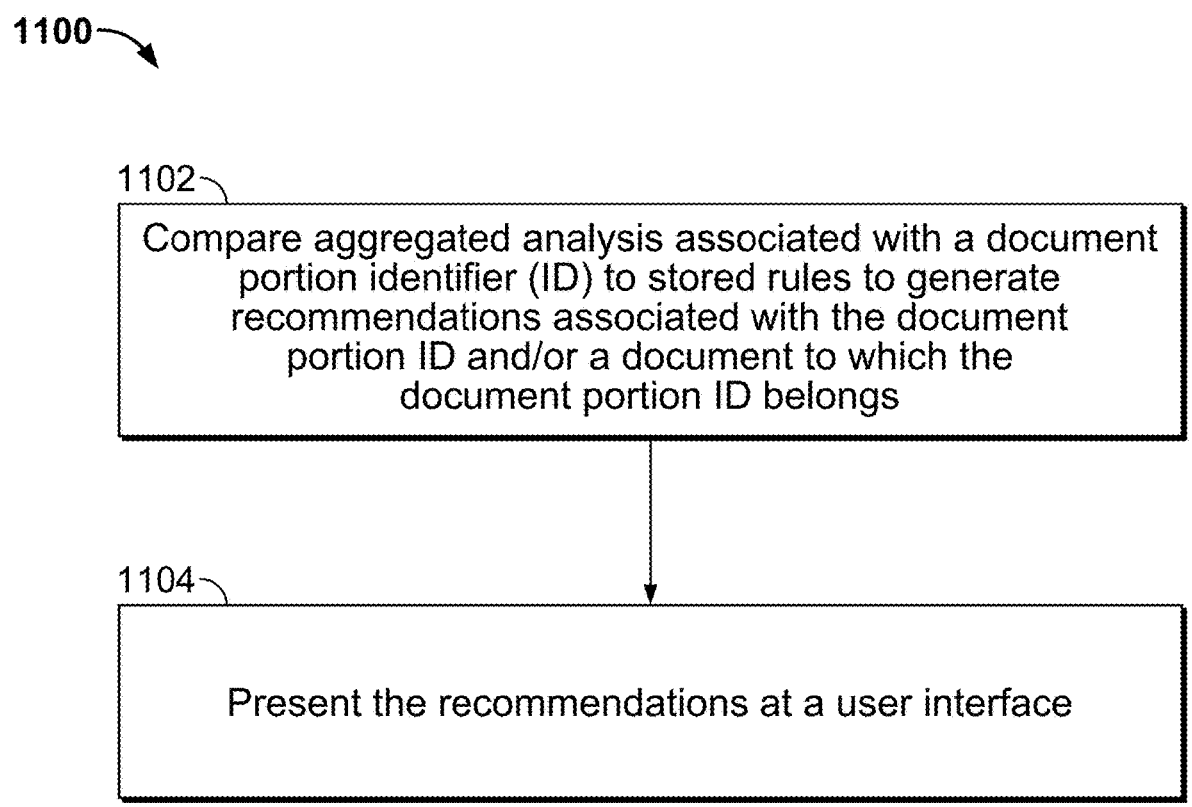
FIG. 11 is a flow diagram showing an example process for generating recommendations based on aggregated analysis associated with a document portion ID in accordance with some embodiments.

FIG. 11 is a flow diagram showing an example process for generating recommendations based on aggregated analysis associated with a document portion ID in accordance with some embodiments. In some embodiments, process 1100 may be implemented, at least in part, by content identification server 112 of system 100 of FIG. 1.

At 1102, aggregated analysis associated with a document portion identifier (ID) is compared to stored rules to generate recommendations associated with the document portion ID and/or a document to which the document portion ID belongs. In some embodiments, analyses (e.g., extracted signals and other metadata) that are determined (e.g., using processes such as process 900 of FIG. 9) from video segments associated with a document portion ID and where the video segments that are determined from across one or more recorded videos are compared to rules that prescribe recommendations for given conditions. For example, a rule can prescribe that if a particular type of aggregated signal with respect to the document portion ID meets a given condition, then a corresponding recommended action to be taken with respect to the document portion associated with that document portion ID or the document to which the document portion ID belongs should be presented at a user interface.

In a first specific example of a rule, if the host participants of recorded meetings failed to say designated phrases associated with a particular document portion ID in the audio portions corresponding to the video segments during which that document portion ID was detected in more than 50% of the reviewed recorded videos, then a recommendation to remind meeting participants to use such designated phrases in subsequent meetings can be presented at a user interface.

In a second specific example of a rule, if the document portion associated with a particular document portion ID detected in video segments includes changes relative to the stored version of the document portion that has been assigned that document portion ID in more than 50% of the reviewed recorded videos, then a recommendation to remind meeting participants to upload to the ID generation server (e.g., ID generation server 102 of system 100 of FIG. 1) the updated documents to which the document portion belongs can be presented at a user interface. For example, it may be desirable to remind users of documents to upload to update documents to the ID generation server so that the ID generation server can detect updated/new document portions within, assign new document portion IDs to the updated/new document portions, and update stored lineage information that describes the relationships between different versions of the same document (e.g., using a process such as process 400 of FIG. 4).

At 1104, the recommendations are presented at a user interface. In some embodiments, the recommendations are presented at a user interface for a user that had historically participated in a recorded video meeting in which the document portion ID was detected.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      obtain a recorded video comprising a plurality of video frames, wherein the recorded video comprises a recording of an online, video-based meeting;
      select a subset of the plurality of video frames as sampled video frames;
      identify a document portion that appears during the recorded video based at least in part on detecting, within a sampled video frame, a presence of a document portion identifier corresponding to the document portion; and
      determine a video segment during which the document portion appears in the recorded video;
      wherein the video segment is defined by a start timestamp and an end timestamp within the recorded video, wherein the start timestamp of the video segment is determined based at least in part on detecting the presence of the document portion identifier corresponding to the document portion within the sampled video frames, and wherein the end timestamp of the video segment is determined based at least in part on no longer detecting the presence of the document portion identifier corresponding to the document portion within the sampled video frames; and
   a memory coupled to the processor and configured to provide the processor with instructions.

2. The system of claim 1, wherein to select the subset of the plurality of video frames comprises to obtain a file associated with screen shared content associated with the recorded video.

3. The system of claim 1, wherein to select the subset of the plurality of video frames comprises to select video frames at each predetermined interval within the plurality of video frames.

4. The system of claim 1, wherein to select the subset of the plurality of video frames comprises to determine unique video frames within the plurality of video frames.

5. The system of claim 1, wherein the processor is further configured to:
   obtain a document comprising a plurality of document portions, wherein the plurality of document portions comprises the document portion;
   obtain a plurality of new document portion identifiers corresponding to the plurality of document portions belonging to the document; and
   apply the plurality of new document portion identifiers to the plurality of document portions.

6. The system of claim 5, wherein the plurality of new document portion identifiers comprises a plurality of barcodes.

7. The system of claim 1, wherein the processor is further configured to:
   determine a first set of signals from an audio segment corresponding to the video segment;
   determine a second set of signals from text transcription corresponding to the video segment;
   determine a third set of signals from video frames included in the video segment; and
   determine a comparison between detected content associated with the document portion that appears in the recorded video and a stored version of a stored document portion associated with the document portion identifier.

8. The system of claim 7, wherein the processor is further configured to update aggregated analysis associated with the document portion identifier with one or more of the following: the first set of signals, the second set of signals, the third set of signals, and the comparison.

9. The system of claim 8, wherein the processor is further configured to:
   compare the aggregated analysis associated with the document portion identifier to stored rules to generate a recommendation; and
   present the recommendation at a user interface.

10. The system of claim 9, wherein the processor is further configured to update aggregated analysis associated with a document to which the document portion belongs with one or more of the following: the first set of signals, the second set of signals, the third set of signals, and the comparison.

11. The system of claim 1, wherein the document portion belongs to a document that comprises a slideshow, a word processing document, a portable document format (PDF), a video, or a set of images.

12. A method, comprising:
obtaining a recorded video comprising a plurality of video frames, wherein the recorded video comprises a recording of an online, video-based meeting;
selecting a subset of the plurality of video frames as sampled video frames;
identifying a document portion that appears during the recorded video based at least in part on detecting, within a sampled video frame, a presence of a document portion identifier corresponding to the document portion; and
determining a video segment during which the document portion appears in the recorded video;
wherein the video segment is defined by a start timestamp and an end timestamp within the recorded video, wherein the start timestamp of the video segment is determined based at least in part on detecting the presence of the document portion identifier corresponding to the document portion within the sampled video frames, and wherein the end timestamp of the video segment is determined based at least in part on no longer detecting the presence of the document portion identifier corresponding to the document portion within the sampled video frames.

13. The method of claim 12, wherein selecting the subset of the plurality of video frames comprises obtaining a file associated with screen shared content associated with the recorded video.

14. The method of claim 12, wherein selecting the subset of the plurality of video frames comprises selecting video frames at each predetermined interval within the plurality of video frames.

15. The method of claim 12, wherein selecting the subset of the plurality of video frames comprises determining unique video frames within the plurality of video frames.

16. The method of claim 12, further comprising:
obtaining a document comprising a plurality of document portions, wherein the plurality of document portions comprises the document portion;
obtaining a plurality of new document portion identifiers corresponding to the plurality of document portions belonging to the document; and
applying the plurality of new document portion identifiers to the plurality of document portions.

17. The method of claim 16, wherein the plurality of new document portion identifiers comprises a plurality of barcodes.

18. A computer program product, the computer program product being embodied in a non-transitory computer readable storage medium and comprising computer instructions for:
obtaining a recorded video comprising a plurality of video frames, wherein the recorded video comprises a recording of an online, video-based meeting;
selecting a subset of the plurality of video frames as sampled video frames;
identifying a document portion that appears during the recorded video based at least in part on detecting, within a sampled video frame, a presence of a document portion identifier corresponding to the document portion; and
determining a video segment during which the document portion appears in the recorded video;
wherein the video segment is defined by a start timestamp and an end timestamp within the recorded video, wherein the start timestamp of the video segment is determined based at least in part on detecting the presence of the document portion identifier corresponding to the document portion within the sampled video frames, and wherein the end timestamp of the video segment is determined based at least in part on no longer detecting the presence of the document portion identifier corresponding to the document portion within the sampled video frames.

19. The system of claim 1, wherein the sampled video frames are reviewed chronologically to detect for the presence of the document portion identifier corresponding to the document portion.

20. The method of claim 12, wherein the sampled video frames are reviewed chronologically to detect for the presence of the document portion identifier corresponding to the document portion.

* * * * *